Patented Dec. 15, 1931

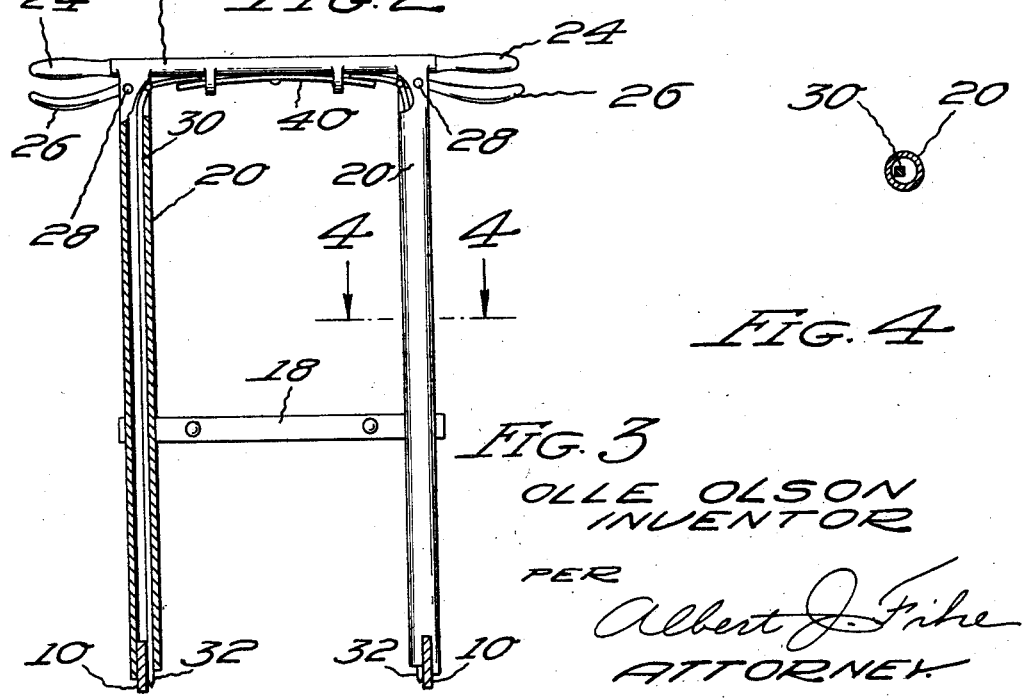

1,836,768

UNITED STATES PATENT OFFICE

OLLE OLSON, OF CHICAGO, ILLINOIS

SLED WITH BRAKE

Application filed August 22, 1927. Serial No. 214,523.

This invention relates to improvements in a sled with brake, and has for one of its principal objects the provision of a sled or similar vehicle, which will accommodate a passenger and also an operator or pusher, and which will allow the operator the free use of at least one of his hands for the purpose of propelling the sled whenever necessary.

One of the important objects of this invention is to provide a sled which may be used for coasting purposes and the like, and which at the same time is provided with a simply operated and powerful brake means whereby the sled may be kept under positive control at all times, even on the steepest hills.

Another and still further important object of this invention is to provide, in a sled, a combination brake and steering mechanism, whereby the sled may be readily guided around corners or bends by the use of a hand brake applied to one or the other of the runners, or to both runners, in different degrees, to provide for a curved motion, and which when applied to both runners in equal degrees accomplishes a braking movement.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved sled of this invention.

Figure 2 is a top plan view of the same, showing in dotted lines the action thereof when being propelled around a curve or bend in the road.

Figure 3 is a detail view, partly in section, showing the construction and operation of the combined braking and guiding elements.

Figure 4 is a sectional view, taken on the line 4—4 of Figure 3.

As shown in the drawings:

The reference numerals 10 indicate generally the sled runners, preferably formed of strips of iron or similar material. These runners are bent upwardly in front in the usual manner and pivotally attached to their ends 12 are seat supporting brackets 14, which are preferably composed of metal straps to provide ample strength. At their upper ends these seat supporting brackets are joined by transverse wooden or metal members 16, which provide a seat, and at the rear ends of the brackets 14 is attached a cross member 18 with in turn is riveted or otherwise securely attached to the pair of propelling uprights 20. These uprights 20 are tubular as best shown in Figure 3, and are joined together at their top by means of a handle member 22 having outwardly extending handles 24 at the ends.

Adjacent each of the handles 24, and positioned directly beneath the same is a brake operating lever 26 pivoted at 28, and having its inner end connected to a downwardly extending rod 30 which passes through the tubular upright 20 and is sharpened at its lower end, as shown at 32, to provide a penetrating or gripping contact with the ground, snow, or ice over which the sled is being propelled. The extent of upward motion of the brake levers 26 is sufficient to provide considerable penetrating contact of the pointed ends 32 with the ground adjacent the runners 10 so that a very good braking effect results.

Further, by actuating either of the levers 26 to a different degree, more or less resistance may be accomplished to either one of the runners 10, and that side of the sled accordingly retarded with the result that the same is constrained to follow a curved path. A leaf spring 40 is provided mounted on the lower end of the handle bar 22, with its ends contacting with the inner ends of the levers 26 so that the braking elements 30—32 are normally withdrawn upwardly and out of contact with the road over which the sled travels.

A foot rest for the operator is provided on the runner 10, as shown at 42, and it will be seen that herein is provided a sled which, in addition to possessing the advantages of ordinary sleds now on the market, can be readily stopped, even when travelling at considerable speeds, and further, can be guided by means of its braking elements to follow any desired curved path, all of the parts at the same time being simple of construction, readily operated, and not liable to damages or the necessity of repairs or replacement.

I am aware that many changes may be made and numerous details of construction varied throughout a wide range without departing from the principles of this invention, and I therefore do not purpose limiting the patent granted hereon otherwise than as necessitated by the prior art.

I claim as my invention:

In a brake mechanism for sleds, a pair of upright hollow handle supports and means within the handle support for manually controlling the motion of the sled, said means comprising a brake rod traversing the length of each handle support, and terminating in an opening in the lower end of said handle support, and means for moving the brake rods longitudinally within the handle structure, said means including a brake lever for each rod, pivotally attached to one end of each of the brake rods and adjacent the cross handle of the sled, the other end of each of the brake rods being sharpened and adapted to be contiguously associated with the surface over which the sled travels by depression of the respective lever, and means for individually returning both of the levers and associated rods to inoperative position upon release thereof, said means comprising a leaf spring mounted beneath the handle, having its ends adapted to cooperate with corresponding inwardly projecting ends of the brake levers.

In testimony whereof I affix my signature.

OLLE OLSON.